US006968625B2

(12) United States Patent
Segerström et al.

(10) Patent No.: US 6,968,625 B2
(45) Date of Patent: Nov. 29, 2005

(54) DEVICE AND METHOD FOR ALIGNMENT OF COMPONENTS (75) Inventors: Martin Segerström, Åsa (SE); Daniel Jonåker, Mölndal (SE); Jan Bodgren, Lindome (SE)

(73) Assignee: A.P. Fixturlaser AB, Molndal (SE)

( * ) Notice: Subject to any disclaimer, the term of this patent is extended or adjusted under 35 U.S.C. 154(b) by 0 days.

(21) Appl. No.: 10/149,391

(22) PCT Filed: Jan. 5, 2001

(86) PCT No.: PCT/SE01/00020

§ 371 (c)(1),
(2), (4) Date: Sep. 12, 2002

(87) PCT Pub. No.: WO01/50082

PCT Pub. Date: Jul. 12, 2001

(65) Prior Publication Data
US 2003/0051354 A1 Mar. 20, 2003

(30) Foreign Application Priority Data
Jan. 5, 2000 (SE) .................................... 0000024

(51) Int. Cl.⁷ ............................................. G01B 11/27
(52) U.S. Cl. ...................... 33/286; 33/412; 33/DIG. 21
(58) Field of Search ........................ 33/412, 529, 286, 33/645, DIG. 21; 356/399, 400

(56) References Cited

U.S. PATENT DOCUMENTS

| 3,901,604 A | 8/1975 | Butler ................... 356/139.09 |
| 4,249,294 A | 2/1981 | Belfiore ........................ 29/271 |
| 4,709,485 A | 12/1987 | Bowman ..................... 33/228 |
| 4,898,464 A | 2/1990 | Thorne et al. ......... 356/139.09 |
| 5,026,998 A | 6/1991 | Holzl .................... 250/559.37 |
| 5,763,597 A * | 6/1998 | Ugarkar et al. ............... 33/286 |

(Continued)

FOREIGN PATENT DOCUMENTS

GB  2 128 324 A  4/1984

(Continued)

OTHER PUBLICATIONS

Hamer Laser S-600, New Equipement Digest, A Penton Publication, Jun. 1999.

(Continued)

*Primary Examiner*—R. Alexander Smith
(74) *Attorney, Agent, or Firm*—Birch, Stewart, Kolasch & Birch (57) ABSTRACT The invention relates to a device for alignment of a first component (1; 25) and a second component (2; 26) in a predetermined relation to each other, comprising first measuring unit (7; 7'; 7") arranged to be mounted on said first component (1; 25) and comprising a light-source (9) for generation of light-radiation (10; 10') with a predetermined pattern in direction towards a second measuring unit (11; 11') arranged to be mounted on said second component (2; 26) and also comprising a second light-source for generation of light radiation (13; 13') with a predetermined pattern in direction towards said first measuring unit (7; 7'; 7"), were each of the measuring units (7, 11; 7'; 7", 11') comprises a detection device for emitted light radiation. The invention is characterized in that each of the measuring units (7, 11; 7'; 7", 11') comprises at least one reference component (18a, 18b, 19a, 19b) which during said alignment is connected with a predetermined position on respective component (1, 2; 26, 26). The invention then provides an improved alignment of for example belt pulleys with consideration to the position of one or more belts for use at the belt pulleys.

16 Claims, 3 Drawing Sheets

U.S. PATENT DOCUMENTS

| | | | |
|---|---|---|---|
| 5,987,762 A * | 11/1999 | Toth et al. | 33/286 |
| 6,031,616 A | 2/2000 | Seiffert | 356/399 |
| 6,040,903 A * | 3/2000 | Lysen et al. | 356/153 |
| 6,098,297 A * | 8/2000 | Belfiore | 33/286 |
| 6,374,507 B1 * | 4/2002 | Lehto | 33/645 |
| 6,434,841 B1 * | 8/2002 | Stahl et al. | 33/286 |
| 6,704,115 B1 * | 3/2004 | Hamar | 356/622 |
| 6,889,441 B2 * | 5/2005 | Seiffert | 33/286 |

FOREIGN PATENT DOCUMENTS

| | | |
|---|---|---|
| GB | 2 329 019 A | 10/1999 |
| GB | 513 112 C2 | 7/2000 |

OTHER PUBLICATIONS

Easy-Laser BTA, Machinery and Equipment MRO, Nov. 1999.

Combi-Laser, Fixturlaser AB, Product Description Publikation nr P-0001-S Design & Layout Fixturlaser AB/ Goteborgstryckeriel, p. 3, date unknown.

* cited by examiner

DEVICE AND METHOD FOR ALIGNMENT OF COMPONENTS

This application is the national phase under 35 U.S.C. § 371 of PCT International Application No. PCT/SE01/00020 which has an International filing date of Jan. 5, 2001, which designated the United States of America.

1. Technical Field

The present invention relates to a device for aligning a first component and a second component in a predetermined relation to each other. The device comprises a first measuring unit which is arranged for mounting on said component and which comprises a light source for generation of light radiation with a predetermined pattern in a direction towards a second measuring unit arranged for mounting on said second component. The second measuring unit also comprises a second light source for generation of light radiation with a predetermined pattern in a direction towards said first measuring unit. Each one of the measuring units also comprises a detection device for emitted light radiation.

The invention also related to a procedure for aligning a first component in relation to a second component.

2. Background Art

At different contexts there is a need for a correct alignment of different components in relation to each other. In connection with running of for example, machines and fan constructions the output power is often transferred from a propelling unit via a rotational movement of an axis and a fist component for power transfer to a second component for power transfer, which together with one more axis constitutes a part of a propelled unit. The components for power transfer may in their turn be arranged for, by way of example, chain driving or belt driving. When belt driving is used the power is transferred via one or more belts which are tightened over two components in the form of belt pulleys which are aligned to each other. Using transmissions of the belt drive type it is essential that the belt pulleys are aligned in relation to each other, thus arranging the belt pulleys with an extension along a common imaginary plane, which in its turn allows the belts to run over the belt pulleys completely straight without being effected by any lateral force. A wrong alignment of the belt pulleys may otherwise lead to an unnecessary high wear on the belts and the belt pulleys and also an unnecessary high power consumption (i.e. a reduced degree of efficiency) of the machines at which the belt pulleys are used.

The alignment of belt pulleys is in particular aimed at reducing or preferably to eliminate possible parallel errors, angular errors and so-called twist errors between the belt pulleys. The term parallel error means that the belt pulleys have their extensions along two separated planes which are parallel in relation to each other. Angular error means that the planes along which the belt pulleys are arranged display a certain angle in relation to each other. Twist errors means that the planes along which the belt pulleys are arranged have been twisted at different degrees around an imaginary longitudinal line which extends along the center of the belt pulleys.

With a correct alignment it can be seen to that the belt pulleys are placed along a common plane without the occurrence of any of the above mentioned errors.

There are different devices and methods for correct alignment of belt pulleys which are previously known. For example, in this concept it is previously known to use a laser device which is placed on the side of one of the belt pulleys and that is arranged to generate a laser line which constitutes an extension of the plane along which the belt pulley is arranged. This laser line is impinges a target board, i.e. a component on the opposite belt pulley on which the laser line is reproduced, thus making possible deviations in relation to a defined reference to appear. After adjustment it may be established if the laser line hits the target boards correctly.

A laser line may alternatively be brought to be reflected against a reflector on the opposite belt pulley, after which the detection is carried out in the same belt pulley as the one from which the laser line was emitted.

Although the known system admits a comparison between the position of two belt pulleys, no consideration is made concerning the position of the belt which is to be used (by being tightened over the belt pulleys). This constitutes a problem, since the placement of the belt determines possible wear and degree of efficiency of the current machines.

A further disadvantage with the known system arises when the distance between the laser light emitter and respective target board is relatively short. In order to acquire a good result at the alignment of two belt pulleys it is desirable to have a distance that is as large as possible between the target boards. On the other hand, at too short distances it is difficult to separate the target boards enough, since the propagation of the laser line is limited. This may in turn lead to unsatisfactory results at the alignment.

DISCLOSURE OF INVENTION

A main purpose with the present invention is to provide an improved device for alignment of components, especially belt pulleys, thus solving the above-mentioned problem.

The invention consists of a device for alignment of a first component and a second component in a predetermined relation to each other, comprising a first measuring unit arranged for mounting on said first component and comprising a light source for generation of light radiation with a predetermined pattern in the direction towards a second measuring unit arranged for mounting on said second component and also comprising a second light source for generation of light radiation with a predetermined pattern in the direction towards said first measuring unit, where each of the measuring units comprises a detection device for emitted light radiation. The invention is characterized in that each of the measuring units comprises at least one reference component which during said alignment is connected with a predetermined position on respective component.

By means of the invention a number of advantages are acquired. When the invention is used for alignment of belt pulleys it may be noted that the device admits an alignment which is related to the position of the belt or the belts which are used at the current belt pulleys. The invention also admits difference methods of detection, for example a purely visual detection of an operator or an electronic detection using photo sensitive detectors. At the latter kind of detection, displaying of the result is carried out using for example light-emitting diodes or a display.

A further purpose of the invention is to provide a device for alignment of belt pulleys which may be used at a number of different kinds of belt pulleys. This purpose is achieved by preferably comprising reference components which consist of detachable components which protrude from respective measuring unit to a corresponding change of form of respective belt pulley. If the invention for example is used at belt pulleys with wedge shaped grooves, the reference components may suitably consist of detachable details, similar to pins, which are mounted in respective measuring unit. Thus the reference components relate to the known reference on the current belt pulley.

A further advantage with the invention is that it admits a fast and simple control in connection with calibration. By indexing the device according to the invention 180° it may be determined if the above-mentioned light pattern moves or not, which admits a simple control of the calibration.

BRIEF DESCRIPTION OF DRAWINGS

The invention will (in the following) be explained in more detail below with reference to a preferred embodiment example and the enclosed drawings, in which.

MODES FOR CARRYING OUT THE INVENTION

Figure 1:
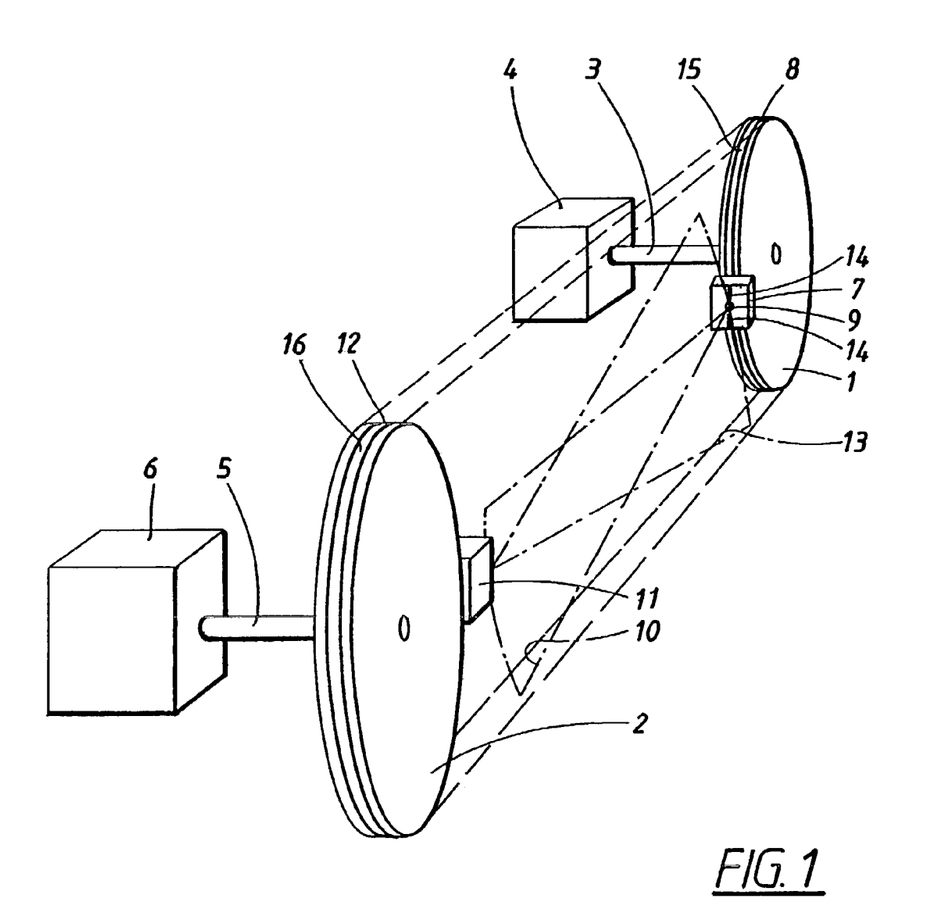
FIG. 1 is a perspective view showing a device according to the present invention, where alignment of two belt pulleys in relation to each other is carried out.

FIG. 1 shows a perspective view of a device according to the present invention. The invention is particularly, but not exclusively, intended to be used at alignment of two belt pulleys 1, 2 in relation to each other, i.e. position them along an imaginary common plane, whereby twist, angular and parallel errors between the belt pulleys 1, 2 are reduced or preferably eliminated.

The invention is suitable to be used at the type of alignment of two components in relation to each other where there is a desire to position these two components along a common plane. In particular, the invention may be used at applications which comprise power transfer by means of rotating transmission devices of, for example, the type chain drive or belt drive, and may then be used in connection with, for example, fan systems or machines.

The invention will in the following be described with reference to an embodiment comprising belt drive, where a power transfer between a first axis and a second axis is provided by means of belt pulleys on respective axis and one or more belts which are tightened over the both belt pulleys.

FIG. 1 shows schematically that the first belt pulley 1 is arranged at a first rotating axis 3, which in its turn constitutes a part of a first, propelling unit 4, for example an engine. Further, the second belt pulley 2 is arranged at a second rotating axis 5, which in its turn constitutes a part of a second unit 6 which is run by said first unit 4. Performing an alignment of the belt pulleys 1, 2 with a device according to the invention, the belt (which is shown schematically with dashed lines in FIG. 1) which during normal use of the units 4, 6 runs around both belt pulleys 1, 2 may remain mounted.

A first measuring unit 7 is mounted on the first belt pulley 1, more exactly on a position along the peripheral edge 8 of the belt pulley 1 against which the above-mentioned belt may bear. According to what will be described in detail below, the first measuring unit 7 comprises a light source for generation of a light with a predetermined pattern. According to the embodiment this light source consists of a laser device 9 which is arranged to generate a first laser line 10 impinges a second measuring unit 11 when activated, which in turn is mounted on the second belt pulley 2, more exactly along a peripheral edge 12 of the second belt pulley 2. The second measuring unit 11 is in conformity with the first measuring unit 7 also equipped with a laser device (not shown in FIG. 1) which is arranged to generate one more laser line 13 which impinges the first measuring unit 7.

The invention may be realized with laser devices of different wavelengths and power. Suitably, a laser which generates laser light with a wavelength of 635–670 nm is used.

The two laser lines 10, 13 have according to the invention an extension which principally coincides with the extension of respective belt pulley 1, 2 and thus constitutes an extension of the plane along which respective belt pulley 1, 2 is arranged.

Further, the two measuring units 7, 11 comprise detection devices for detection of the position of impingement of respective laser line 10, 13, in order to be able to determine if the belt pulleys 1, 2 are correctly aligned. In more detail, the first measuring unit 7 comprises a marking 14 in the form of two lines on its front surface (i.e. on the surface of the first measuring unit 7 which is facing the second measuring unit 11), which lines 14 extends along the same plane as the above-mentioned laser lines 10, 13. The device according to the invention is calibrated in such a way that the laser line 13 from the second measuring unit 11 is intended to impinge in such a way, that it is projected over the two lines 14 of the first measuring unit 7 at the same time as when the belt pulleys 1, 2 are aligned.

In a corresponding manner it may be determined whether the laser line 10 from the first measuring unit 7—which impinges against and is projected on a corresponding detection device (not shown in FIG. 1) in the second measuring unit 11—impinges exactly along two lines in the second measuring unit 11. When both laser lines 10, 13 impinges respective detection device it may be determined that the belt pulleys 1, 2 are correctly aligned, and that the belt or the belts which are tightened around the belt pulleys 1,2 runs straight and smooth, without being affected by any lateral force.

According to the invention, the first measuring unit 7 is mounted along the periphery 8 of the first belt pulley 1. According to what will be described in detail below, the first measuring unit 7 is mounted in such a way that it is mechanically coupled to and connected with a wedge-shaped groove 15 that in a known way runs around the periphery 8 of the belt pulley 1. This wedge-shaped groove 15 is used for fixation of the position of the belt or the belts which are intended to be tightened around the belt pulleys 1, 2. In a corresponding manner the second measuring unit 11 is mounted to be connected with a wedge-shaped groove 16 along the edge of the second belt pulley 2. When the belt pulleys 1, 2 consist of a magnetic material, the two measuring units 7, 11 are preferably mounted at respective belt pulley 1, 2 using magnets (not shown in FIG. 1) that exercise a retaining force against respective peripheral edge.

Figure 2:
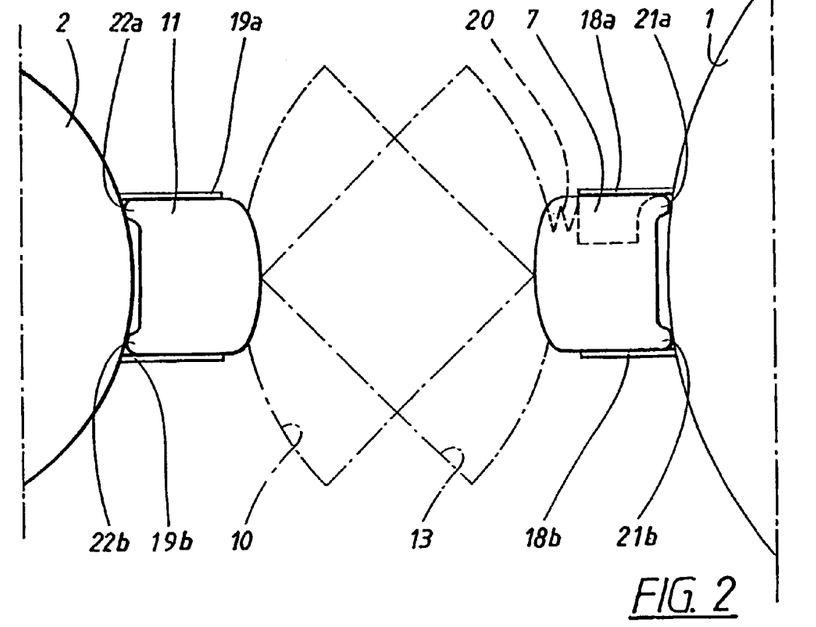
FIG. 2 is a side view of said device.

In FIG. 2 a side view of the device according to the invention is shown, there it is disclosed how the first laser line 10 impinges the second measuring unit 11 and the second laser line impinges the first measuring unit 7. For purposes of simplicity the belt (see FIG. 1) which during normal use runs over the two belt pulleys 1, 2 is not shown in FIG. 2.

Figure 3:
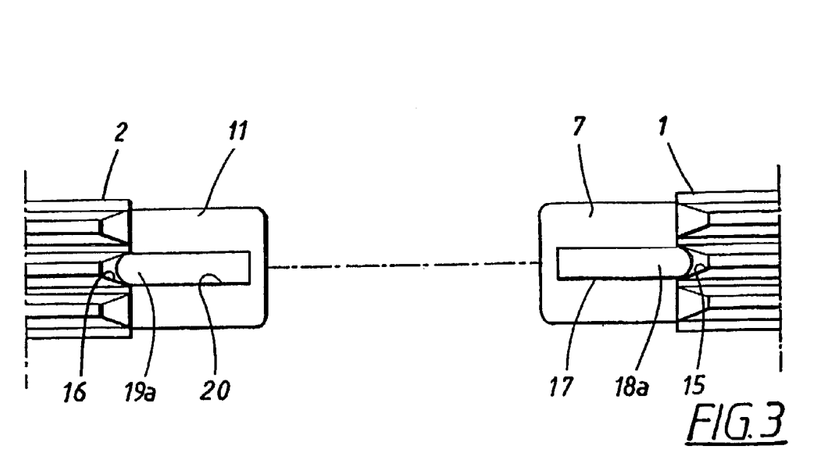
FIG. 3 is a top view of said device.

In FIG. 3 a top view of the device according to the invention is shown. It is a basic principle behind the invention that respective measuring unit 7, 11 is designed to be mounted at respective belt pulley 1, 2 with a predetermined position in relation to respective wedge-shaped groove 15, 16 i.e. in relation to the belt that shall be used around the belt pulleys 1, 2. For this purpose the first measuring device 7 comprises an opening 17 facing the first belt pulley 1 in which opening at least one, preferably two reference components 18a, 18b are arranged. According to what is disclosed in FIG. 2 the reference components 18a, 18b are arranged in particular at the upper and lower part of the measuring unit 7 and are arranged to protrude behind the first measuring unit 7 and into the wedge-shaped groove 15. The end parts of the reference components 18 are then designed to fit into the wedge-shaped groove 15. Suitably, said end part is mainly V-shaped, but other shapes may alternatively occur to be adapted to the shape of different types of grooves and recesses along an edge on a belt pulley.

The invention is based on the fact that the position of the reference components 18a, 18b corresponds to a predetermined position of the belt pulley 1, more exactly a position which in turn corresponds to the position of the belt or the belts which are to be tightened around the belt pulleys 1, 2. In other words a reference which relates to the center of the wedge-shaped grooves 15, 16 is acquired from respective reference components 18a, 18b. Further, said reference components 18a, 18b are easy to replace, which means that the system may be used at different kinds of belt pulleys.

In a corresponding way as in the first measuring unit 7, the second measuring unit 11 is designed with further reference components 19a, 19b, which are interchangeably arranged in an opening 20 in the second measuring unit 2. In a corresponding way as in the first measuring unit 7 said further reference components 19a, 19b are arranged to cooperate on a predetermined position with the wedge-shaped groove 16 in the second belt pulley 2. The last mentioned reference components 19a, 19b are also easy to replace. This means that the device according the invention is easy to adapt to be used at alignment of different types of belt pulleys, just by exchanging the reference components 18a, 18b, 19a, 19b to other types which gives a correct position in relation to the belt or those belts which are intended to be used at the respective application.

The reference components 18a, 18b, 19a, 19b are preferably mounted to be biased with the help of springing devices (see spring device 20 at the first mentioned reference component 18a, which is schematically indicated with dashed lines in FIG. 2) being a part of respective measuring unit 7, 11. Thus the reference components 18a, 18b, 19a, 19b are in contact with the corresponding wedge-shaped groove 15, 16.

Respective measuring unit 7, 11 also includes (as mentioned above) magnetic elements 21a, 21b, 22a, 22b, which define references to the peripheral edges 8, 12 at respective belt pulley 1, 2, as they bear on those edges 8, 12. This form of reference is also provided in the case where the invention is mounted and used at belt pulleys which are not of magnetic material. The two magnetic elements 21a, 21b which are arranged in the first measuring unit 1 are suitably designed as vertically separated protrusions which are facing the peripheral edge 8 of the first belt pulley 1. In a corresponding way there are two magnetic elements 22a, 22b arranged in the second measuring unit 11.

During alignment of the belt pulleys 1,2 the two measuring units 7, 11 are thus mounted along the peripheral edge of respective belt pulley 1, 2. After that, respective laser device is activated, thus bringing the two laser lines 10, 13 to impinge respective measuring unit 7, 11. The laser devices are calibrated in advance in such a way the laser lines 10, 13 are given an extension along a plane which corresponds to the extension of respective belt pulley 1, 2. When the laser line 13 impinges the first measuring unit 7 ends up along the marking which is defined by the two lines 14—and if the laser line 10 impinges the second measuring unit 11 ends up along a corresponding marking on the second measuring unit 11—it may be determined that the two belt pulleys 1, 2 are correctly aligned in relation to each other. When an alignment is not acquired, a correction of the position of the belt pulleys in relation to each other has to be done. This may in turn be done by adjusting the position of one or both the units 4, 6, or by adjusting the mounting of one or both belt pulleys 1, 2 on respective axis 3, 5.

It is thus evident that the invention is arranged in such a way that the laser light of the first measuring unit 7 corresponds to an extension of the recess 15 in its appertunant belt pulley 1, i.e. an extension of the plane along the which the recess 15 is arranged. The light from the first measuring unit 7 is then detected with the help of the target board which is defined of the second measuring unit 11, which then in turn constitutes an extension of the recess 16 in its belonging belt pulley 2, i.e. an extension of the plane along which the recess 16 in its belt pulley 2 is arranged.

Figure 4:
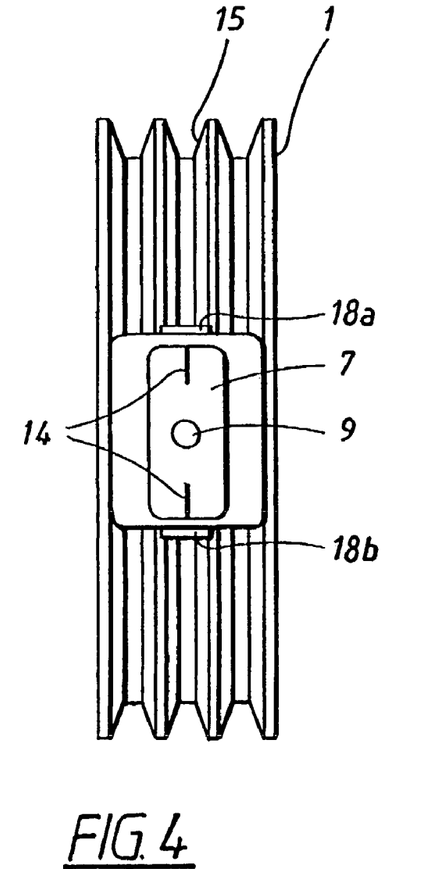
FIG. 4 is a front view of a part of said device.

FIG. 4 shows a front view of the first measuring unit 7. The second measuring unit (not shown in FIG. 4) is arranged in an identical manner. The figure discloses that the front surface of the measuring unit 7 is designed with a detection device in the form of the above mentioned two lines 14, which purpose is to constitute a marking which position is compared with the impinging laser line 11 from the second measuring unit (see FIG. 1). The device is calibrated in such a way that correct alignment of the belt pulleys corresponds to that the laser lines coincide with both lines on the measuring units.

Figure 5:
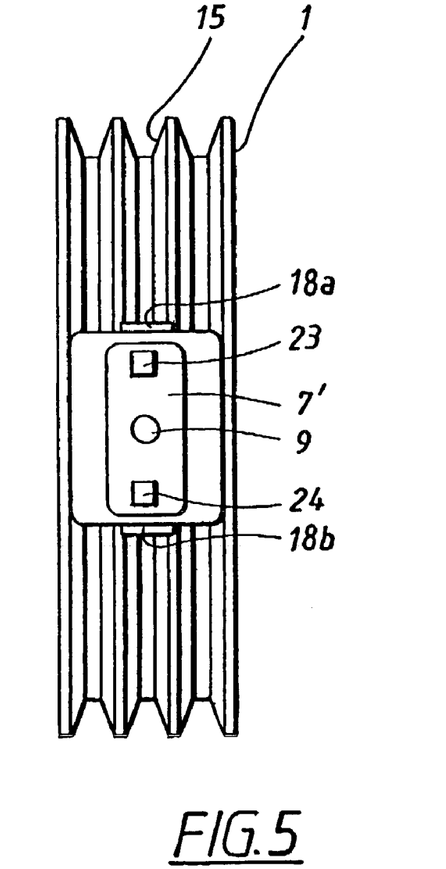
FIG. 5 is a view corresponding to FIG. 4 that shows an alternative embodiment of the invention.

In FIG. 5 an alternative embodiment of the first measuring unit 7' is shown, comprising a detection device which in turn consists of two photo-sensitive sensors 23, 24. The other measuring unit (not shown in FIG. 5) is preferably identically arranged. Different types of sensors can then be used, for example position sensitive detectors (PSD) or photo diodes. When the laser light line originating from the second measuring unit hits the first measuring unit 7' in such a way that both sensors 23, 24 are hit by laser light on a predetermined position on respective sensor 23, 24 (and the laser line from the corresponding measuring unit is emitted in a corresponding manner towards the second measuring unit) is an indication of a correct alignment of the, belt pulleys. This may be registered electronically with the help of an electronic unit (not shown) built-in in the measuring unit 7' and may be indicated for the user with a suitable indicator, for example in the form of a light emitting diode or a display unit (not shown). Alternatively, the first measuring unit 7' may be connected to an external evaluation unit for determining whether the laser light impinges in the expected manner. Dependent of the result from the detection at respective measuring unit, the machines or the like at which the belt pulleys are used may then be manually adjusted to obtain a correct alignment.

Although only the first measuring unit 7' is shown in FIG. 5, the invention according to this embodiment also comprises a second measuring unit which has the same construction as the shown first measuring unit 7' and that also is connected to the above-mentioned evaluation unit.

Figure 6:
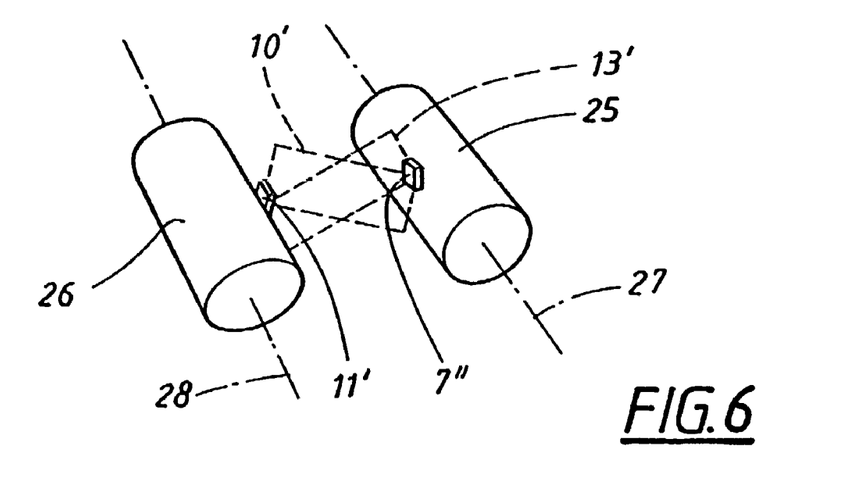
FIG. 6 shows schematically one further application at which the invention may be used.

A further embodiment of the invention will now be described with reference to FIG. 6, which schematically and much simplified shows an arrangement with two rolls 25, 26. The first roll 25 is intended to rotate around a first imaginary rotational axis 27, while the other roll is intended to rotate around a second imaginary rotational axis 28. The two rolls 25, 26 are arranged to have an essentially parallel extension. The rolls 25, 26 may for example be of the type which can be used in connection with paper manufacturing or similar.

When aligning the rolls 25, 26, the first roll 25 is equipped with a first measuring unit 7" which is mounted—in a similar way as described above—along the periphery of the first roll 25. In a corresponding way a second roll 26 is equipped with a second measuring unit 11' of principally the same type as the first measuring unit 7". The two measuring-units which may be used at alignment of rolls are essentially of the same type as those used for alignment of belt pulleys, according to what has been described above, but may have an external design with reference components and the like which are especially adapted for mounting at rolls.

By placing each measuring unit 7", 11' on respective parallel roll 25, 26 the laser line from respective measuring unit will constitute a perpendicular description of the pointing direction of respective roll 25, 26. Thus the invention may be used to direct the rolls 25, 26 to positions where they are completely parallel to each other. The laser line 10' of the first measuring unit 7" determines the position of the placement of the second measuring unit 11' in the extension of the second roll 26. The other measuring unit 11' is placed with its target board completely in line with the laser line 10' of the first measuring unit 7". When this has been accomplished the laser line 13' of the second measuring unit 11' describes the error in relation to the target board of the first measuring unit 7". With this method the possible errors in both horizontal and vertical direction of the roll is acquired. During the adjustment procedure the laser line 10' of the first measuring unit 7" is suitably retained against the target board of the second measuring unit 11'.

The further embodiment described is not limited to be used in connection with rolls. The same alignment method may in principle be used for other tube- and axis-shaped components.

The invention is not limited to the embodiments described above and to the drawings, but may be varied within the scope of the appended claims. The invention may for example be used for alignment of different components which in particular are intended to be positioned along a common plane. The invention is especially suited for applications which are based on belt drive, for example in connection with fan arrangements, transmissions, machines etc. The invention is not limited to components that are connected with each other with for example chains or belts, but may also be used for alignment of components which are standing alone where there is such a need. As mentioned above, the invention may be used for aligning rolls and similar components.

Where the inventions is used for belt pulleys it may be used for belt pulleys which are designed with the above described wedge-shaped grooves, but also for systems comprising belt pulleys with other types of grooves or recesses and which admits a reference to the belt or the belts which are intended for the belt pulleys.

The patterns which are generated of respective laser device may consist of straight, continuos lines, broken lines, or other suitable patterns which distinctly defines the plane of respective belt pulley. When laser lines are generated these may be in line with the plane along which respective belt pulley is arranged, or may alternatively be parallel displaced with said plane.

The above-mentioned reference components may be used to relate to positions as well along the periphery as the side of respective belt pulley.

The invention may in principle be used with a first measuring unit comprising only one laser device (i.e. no detection device) and a second measuring unit which only comprises a detection device (i.e. no laser device). For such a case the measuring units must be exchanged between the two current components (which for example consists of belt pulleys) at the alignment of the components.

According to a further embodiment, target boards that are standing alone may be used, which then in accordance with the invention are placed as far from the unit as possible along the belt pulley in the same plane as the unit. If such detached target boards are positioned relatively far away from respective belt pulley, in particular the so called twist error may be detected

What is claimed is:

1. A belt pulley system, including a device for alignment of a first power transferring belt pulley and a second power transferring belt pulley in a predetermined relation to each other by measuring parallel, angular, and twist errors between the pulleys, comprising:
    a first measuring unit arranged for mounting on said first belt pulley and comprising a laser device for generation of laser radiation with a predetermined pattern in a direction towards a second measuring unit arranged for mounting on said second belt pulley and comprising a second laser device for generation of laser radiation with a predetermined pattern in the direction towards said first measuring unit,
    wherein each of the measuring units comprises a detection device for emitted laser radiation,
    wherein each laser device is adapted so that each laser radiation pattern is in the form of a line pattern, each line pattern extends perpendicularly to the plane defined by the peripheral operable face of the respective belt pulley from a point within the width of the peripheral operable face,
    wherein each of the measuring units comprises at least one reference component which during said alignment is connected with a predetermined position on each belt pulley, and
    wherein the measuring units are mounted only on the outer, peripheral operable face of the respective belt pulley,
    the measuring units measuring parallel, angular, and twist errors in alignment between the first power transferring belt pulley and the second power transferring belt pulley.

2. The belt pulley system according to claim 1, wherein said measuring units are in mechanical contact with said predetermined position, which is chosen along the peripheral operable face of respective belt pulley.

3. The belt pulley system according to claim 1, wherein said radiation pattern consists of a line pattern aligned with respective belt pulley and that said detection device consists of one or more lines for visual determination of the position of the incident light pattern generated by corresponding laser device.

4. The belt pulley system according to claim 1, wherein said detection device consists of two separate light sensitive sensor elements which are calibrated in such a way that said light pattern at correct alignment of said belt pulleys runs through predetermined positions on the sensor elements simultaneously.

5. The belt pulley system according to claim 1, wherein said belt pulleys comprise peripheral wedge-shaped grooves where the design of the reference components is essentially V-shaped to fit the center of the respective wedge-shaped groove.

6. The belt pulley system according to claim 1, wherein the reference components are interchangeably arranged in the respective measuring unit.

7. The belt pulley system according to claim 6, wherein the reference components consist of detachable components which protrude from respective measuring unit to a corresponding change of form of the respective belt pulley.

8. The belt pulley system according to claim 1, wherein said measuring units are arranged for mounting at respective belt pulleys with the help of magnetic force from magnets that are part of the respective measuring unit.

9. The belt pulley system according to claim 8, wherein said magnets define a reference to the peripheral operable face of the respective belt pulleys.

10. The belt pulley system according to claim 1, wherein said measuring units are arranged in such a way that said predetermined pattern of the first measuring unit corresponds to an extension of the plane along which a recess in corresponding belt pulley is arranged, where said second measuring unit constitutes an extension of the plane along which a recess in the corresponding belt pulley is arranged.

11. The belt pulley system according to claim 1, wherein said first belt pulley and said second belt pulley consist of tube-, axis-, or roll-shaped components.

12. Measuring unit intended for alignment of a first power transferring belt pulley and a second power transferring belt pulley in a predetermined relation to each other including a belt which is tightened over the belt pulleys by measuring parallel, angular, and twist errors between the pulleys in operation with a second identical measuring unit which measuring unit is mounted along the peripheral edge of one of the belt pulleys, said measuring unit comprises a laser device for generation of a light pattern towards said second measuring unit mounted on said second power transferring belt pulley and also a detection device for detection of a laser radiation pattern from said second measuring unit,
wherein said laser device is adapted so that said pattern is in the form of a line pattern, the line extends perpendicularly to the plane defined by the peripheral operable face of the respective belt pulley from a point within the width of the peripheral operable face,
wherein said measuring unit comprises at least one reference component which during said alignment is connected to a predetermined position of the corresponding belt pulley,
the measuring unit along with the second measuring unit measuring parallel, angular, and twist errors in alignment between the first power transferring belt pulley and the second power transferring belt pulley.

13. The belt pulley system according to claim 12, wherein said belt pulleys comprise peripheral wedge-shaped grooves where the design of the reference components is essentially V-shaped to fit the center of the respective wedge-shaped groove.

14. Procedure for alignment of a first power transferring belt pulley and a second power transferring belt pulley in a predetermined relation to each other by measuring parallel, angular, and twist errors between the pulleys, comprising:
mounting a first measuring unit to said first belt pulley,
mounting a second measuring unit on said second belt pulley,
generating a laser radiation pattern from the first measuring unit in a direction towards the second measuring unit,
generating a further laser radiation pattern from the second measuring unit in a direction towards the first measuring unit, wherein each pattern is in the form of a line pattern, each line pattern extends perpendicularly to the plane defined by the peripheral operable face of the respective belt pulley from a point within the width of the peripheral operable face,
detecting said pattern by means of detection devices in said first measuring unit and said second measuring unit,
wherein said mounting of the first measuring unit and the second measuring unit is carried out in a manner so that each measuring unit is mounted only on the outer, peripheral operable face of the respective belt pulley,
measuring parallel, angular, and twist errors in alignment between the first power transferring belt pulley and the second power transferring belt pulley.

15. A belt pulley system, including a device for alignment of a first power transferring belt pulley and a second power transferring belt pulley in a predetermined relation to each other by measuring parallel, angular, and twist errors between the pulleys, comprising:
a first measuring unit arranged for mounting on said first belt pulley and comprising a laser device for generating laser radiation with a predetermined pattern in a direction towards a second measuring unit arranged for mounting on said second belt pulley and comprising a detection device for said laser radiation,
wherein said laser device is adapted so that said pattern is in the form of a line pattern the line pattern extends perpendicularly to the plane defined by the peripheral operable face of the respective belt pulley from a point within the width of the peripheral operable face,
wherein each of the measuring units comprises at least one reference component which during said alignment is connected to a predetermined position on respective belt pulley, and
wherein the measuring units are mounted only on the outer, peripheral operable face of the respective belt pulley,
the measuring units measuring parallel, angular, and twist errors in alignment between the first power transferring belt pulley and the second power transferring belt pulley.

16. Device for alignment of a first power transferring belt pulley and a second power transferring belt pulley in a predetermined relation to each other including a belt which is tightened over the belt pulleys, comprising:
a first measuring unit arranged for mounting on said first belt pulley and comprising a laser device for generation of laser radiation with a predetermined pattern in a direction towards a second measuring unit arranged for mounting on said second belt pulley and comprising a second laser device for generation of laser radiation with a predetermined pattern in the direction towards said first measuring unit,
wherein each of the measuring units comprises a detection device for emitted laser radiation,
wherein each laser device is adapted so that each laser radiation pattern essentially constitutes an extension of a plane along which each belt pulley is arranged,
wherein each of the measuring units comprises at least one reference component which during said alignment is connected to each belt pulley, each belt pulley comprising wedge-shaped grooves, said reference components fit into the respective wedge-shaped groove in order to establish a reference for the center of the wedge-shaped groove, and each of the measuring units mounted on said respective belt pulley at a position based on the location of the corresponding reference component, wherein said reference components are replaceable, and thereby can be replaced with reference components suitable for different types of belt pulleys, and the measuring units measuring parallel, angular, and twist errors in alignment between the first belt pulley and the second belt pulley.

* * * * *